United States Patent [19]
Horian

[11] Patent Number: 5,433,326
[45] Date of Patent: Jul. 18, 1995

[54] DISPLAY RACK

[75] Inventor: James G. Horian, Newport Beach, Calif.

[73] Assignee: Metro Bay Products, Inc., Costa Mesa, Calif.

[21] Appl. No.: 197,508

[22] Filed: Feb. 16, 1994

[51] Int. Cl.⁶ .............................................. A47F 5/00
[52] U.S. Cl. ..................................... 211/188; 211/194
[58] Field of Search ............... 211/189, 186, 133, 188, 211/194, 128

[56] References Cited

U.S. PATENT DOCUMENTS

| | | | |
|---|---|---|---|
| 3,217,671 | 11/1965 | Walsh | 211/188 X |
| 4,428,487 | 1/1984 | Hepp | 211/188 X |
| 4,862,602 | 9/1989 | Krill | 211/188 X |
| 4,984,690 | 1/1991 | King et al. | 211/188 X |
| 4,998,023 | 3/1991 | Kitts | 211/188 X |
| 5,158,187 | 10/1992 | Taub | 211/186 |

Primary Examiner—Alvin C. Chin-Shue
Assistant Examiner—Sarah L. Purol
Attorney, Agent, or Firm—Lyon & Lyon

[57] ABSTRACT

A rack for display and storage having multiple decks with each deck including corner supports, side supports and a supported plate. In addition, extruded side rails connect the several supports. Elongate columns make multiple decks possible. Casters under the lowermost deck provide a rolling feature to the structure.

12 Claims, 6 Drawing Sheets

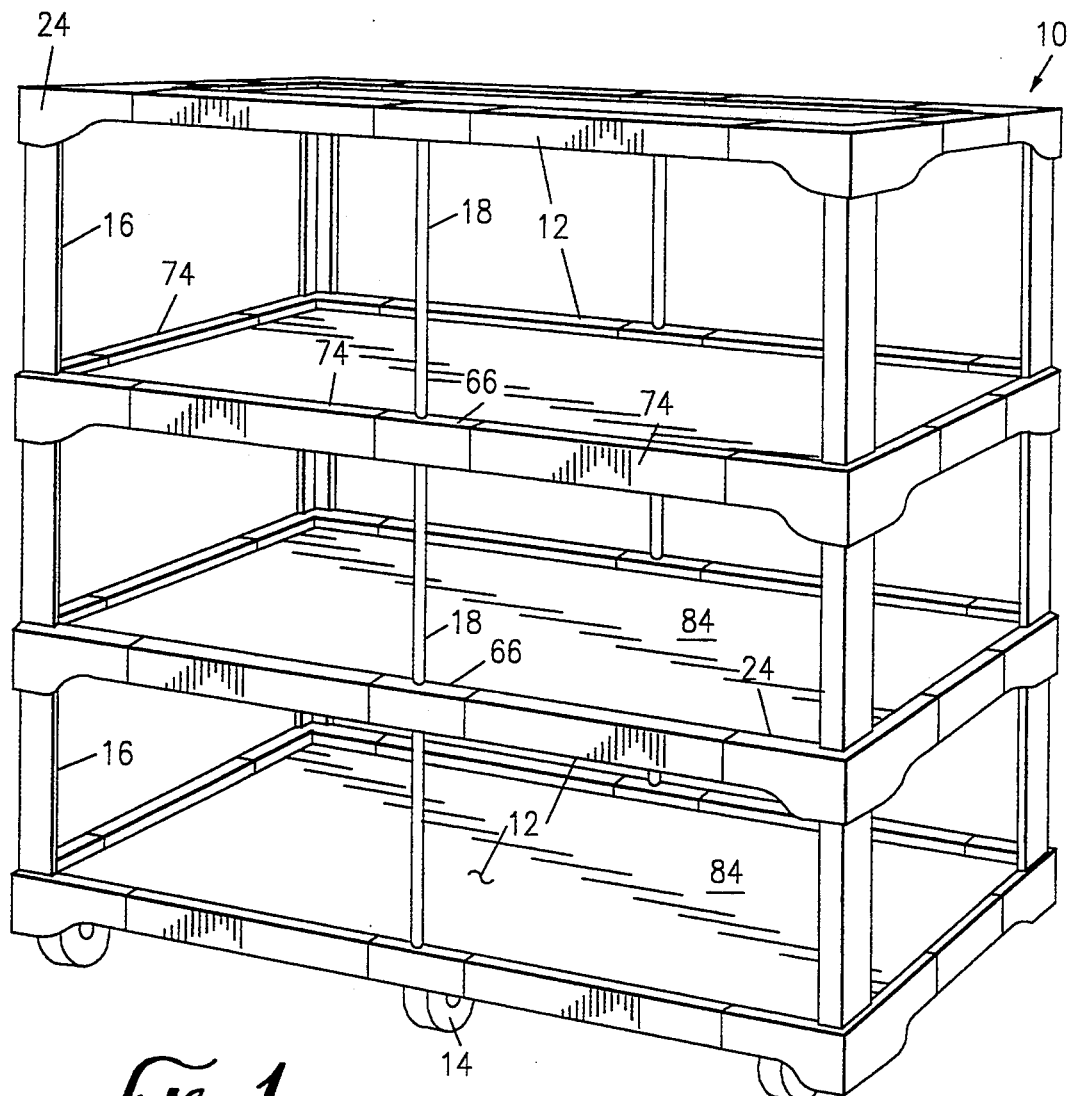
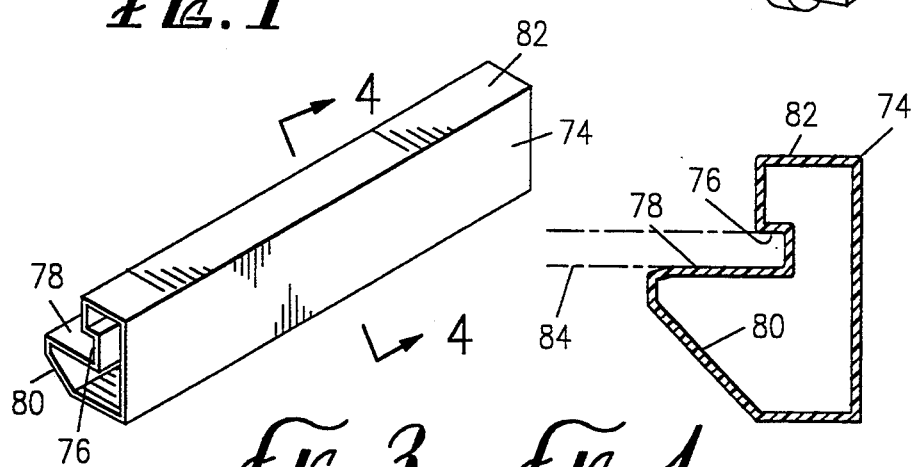

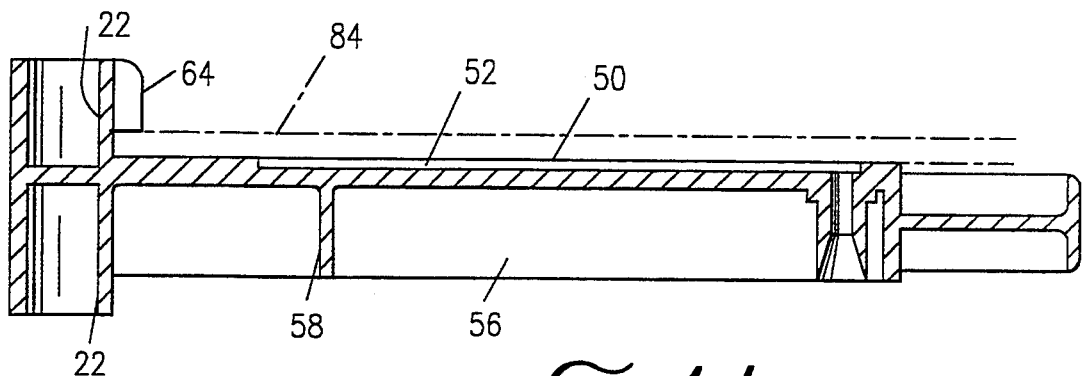
_FIG. 14_
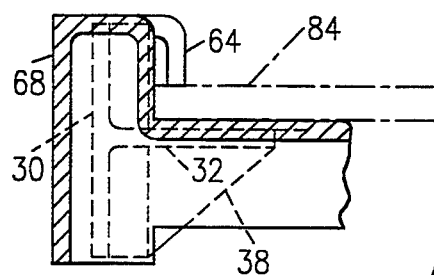
_FIG. 15_
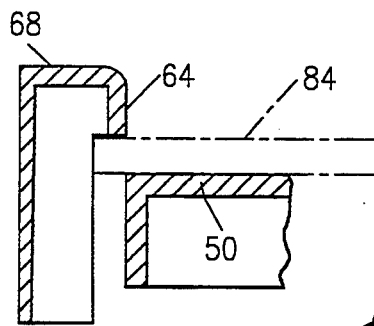
_FIG. 16_

DISPLAY RACK

BACKGROUND OF THE INVENTION

The field of the present invention is storage and display racks.

Storage and display racks for retail goods are required to be sturdy and yet open to properly provide access to and full display of products. Such shelving can be subject to hundreds of pounds of product. It is also frequently advantageous to have displays movable for featuring a product, restocking and the like.

Adequate storage and display racks, when not custom made, are frequently of formed metal sheet fabricated with stiffening corrugations or understructure. Such designs are characteristically not easily modified without changing dies and the like. The structures are frequently a compromise of design parameters between flimsy and excessively heavy. Using metal sheet also is not acoustically desirable. Shelving on rollers can further complicate such deficiencies.

Plastic shelving has been available as well. Such shelving frequently requires complicated assembly and can also suffer from lack of structural rigidity. Because of molding requirements, design changes and size modifications are difficult to accomplish.

BRIEF DESCRIPTION OF THE INVENTION

The present invention is directed to a rack for storage or display. Corner supports and side supports are employed with side rails through a pin and socket arrangement to form a structural perimeter. A plate is positioned on and attached to the supports.

In a first specific and separate aspect of the present invention, the corner supports include pins extending at 90° with a base bifurcating this angle. The side supports include such pins at 180° and also have a base extending laterally in one direction. Thus, a solid support is provided by the corner and side supports with side rails spanning between supports for a rigid plate. In a further detail, the side rails may also provide support for the rigid plate. Where mobility is desirable, casters may be associated with the support attachment bases.

In a second specific and separate aspect of the present invention, the supports again include bases extending inwardly to support a plate. The supports are associated with side rails through a rigid pin and socket connection preventing rotation of the rails relative to the supports. The side rails include a channel to receive the edge of the plate to resist flexure and bending. It is possible to affix the channels to the plate for even further rigidity. The side panels may conveniently be extrusions of thin wall tubing with an appropriate cross section to define the channel, to define sockets so as to be capable of rigid coupling with the supports and to form a rigid support structure about the channel.

In a third specific and separate aspect of the present invention, any of the foregoing structures may be provided with vertical sockets for receiving elongate columns. Multiple layers of shelving may then be accommodated.

Accordingly, it is an object of the present invention to provide improved racks having substantial utility for storage and display. Other and further objects and advantages will appear hereinafter.

BRIEF DESCRIPTION OF THE DRAWINGS

FIG. 1 is a perspective view of a multiple level rack.

FIG. 3 is a perspective view of a side rail.

FIG. 4 is a cross-sectional view taken along line 4—4 of FIG. 3.

FIG. 14 ms a cross-sectional view taken along line 14—14 of FIG. 11.

FIG. 15 is a cross-sectional view taken along line 15—15 of FIG. 11.

FIG. 16 is a cross-sectional view taken along line 16—16 of FIG. 11.

DETAILED DESCRIPTION OF THE PREFERRED EMBODIMENT

Figure 2:
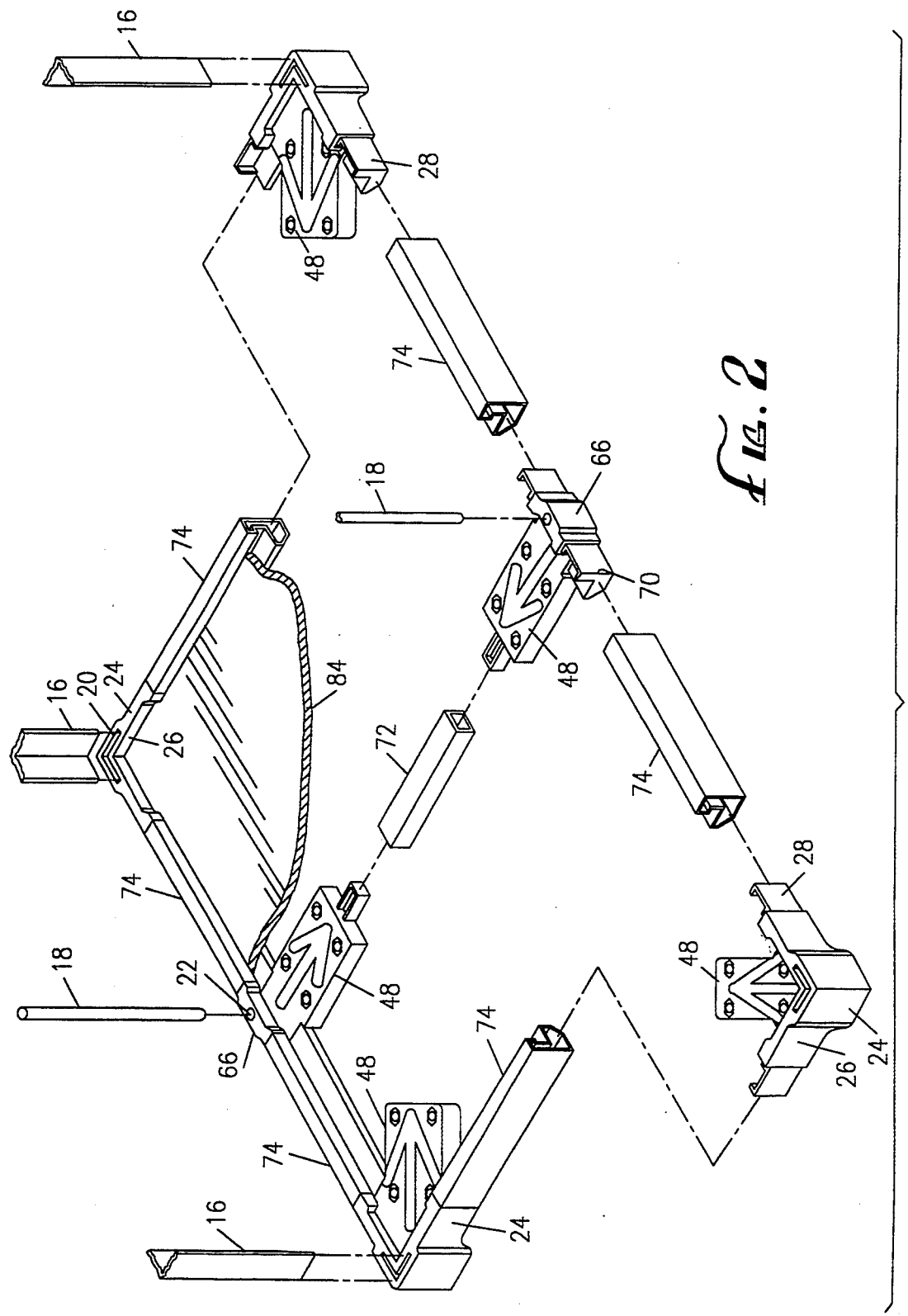
FIG. 2 is an exploded perspective view of a panel with a plate partially removed for clarity.
Figure 5:
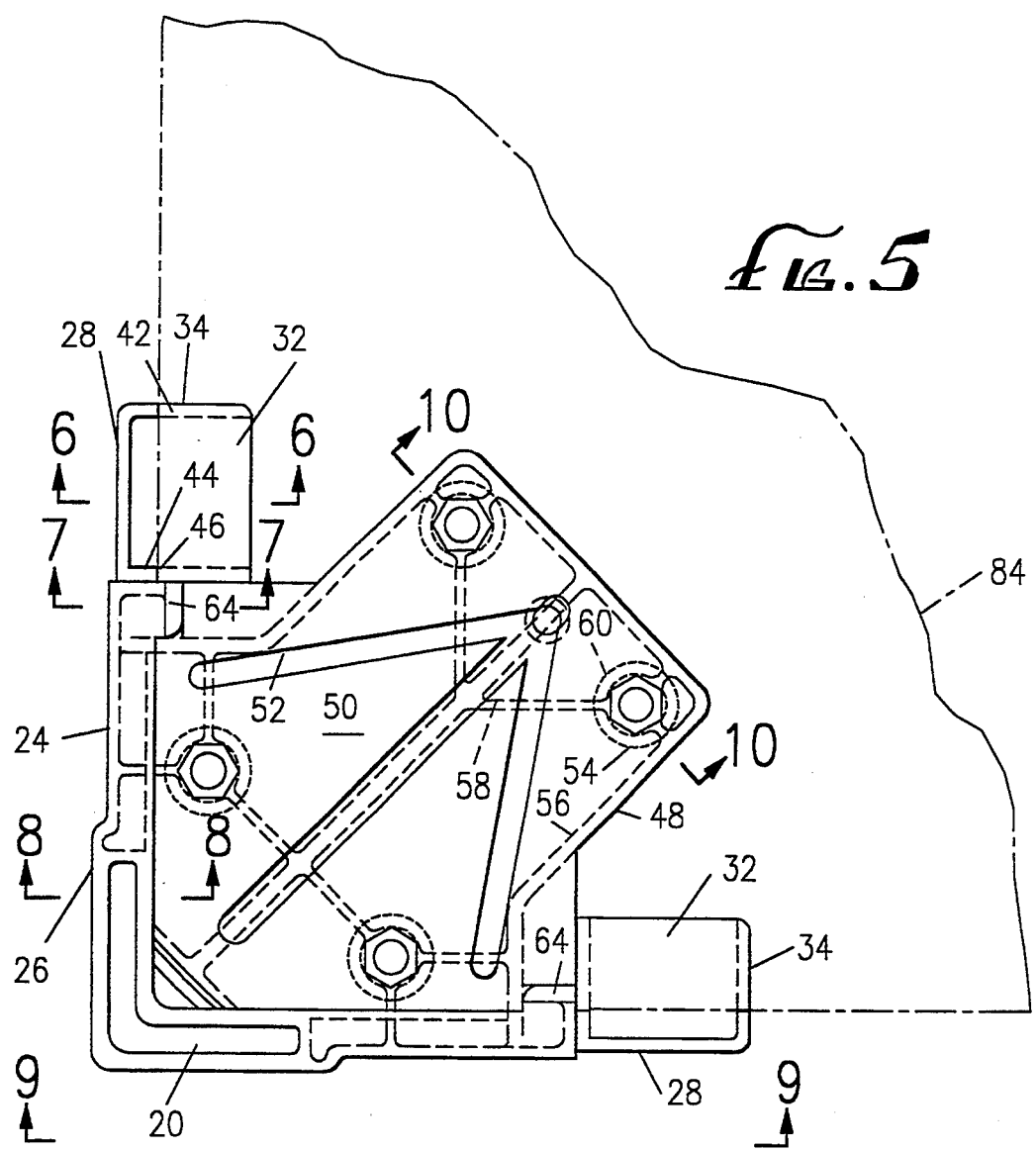
FIG. 5 is a plan view of a corner support with a panel shown in phantom.

Turning in detail to the drawings, FIG. 1 illustrates an assembled rack, generally designated 10 having four decks. Each deck 12 is identically arranged but for the casters 14 associated with the lowermost deck 12. Elongate columns 16 are formed of angle members which extend from deck to deck. Also, elongate columns 18 extend from deck to deck. These columns 18 are formed by solid rods or tubes. The columns 16 and 18 are associated with vertically oriented sockets 20 and 22, respectively, which are found both top and bottom of each deck, reference being made to FIG. 2.

Figure 6:
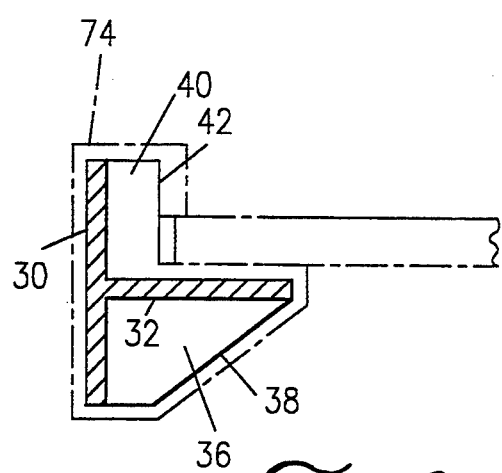
FIG. 6 is a cross-sectional view taken along line 6—6 of FIG. 5.
Figure 7:
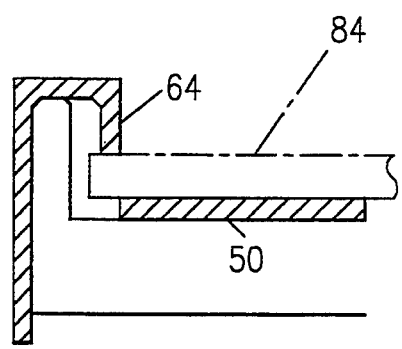
FIG. 7 is a cross-sectional view taken along line 7—7 of FIG. 5.
Figure 8:
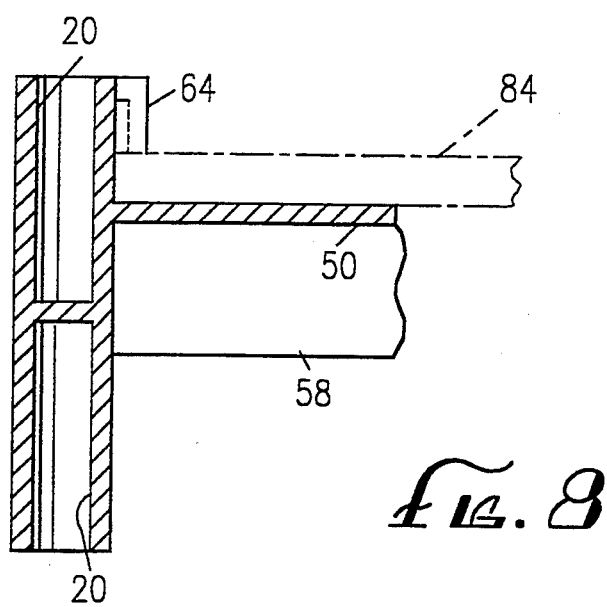
FIG. 8 is a cross-sectional view taken along line 8—8 of FIG. 5.
Figure 9:
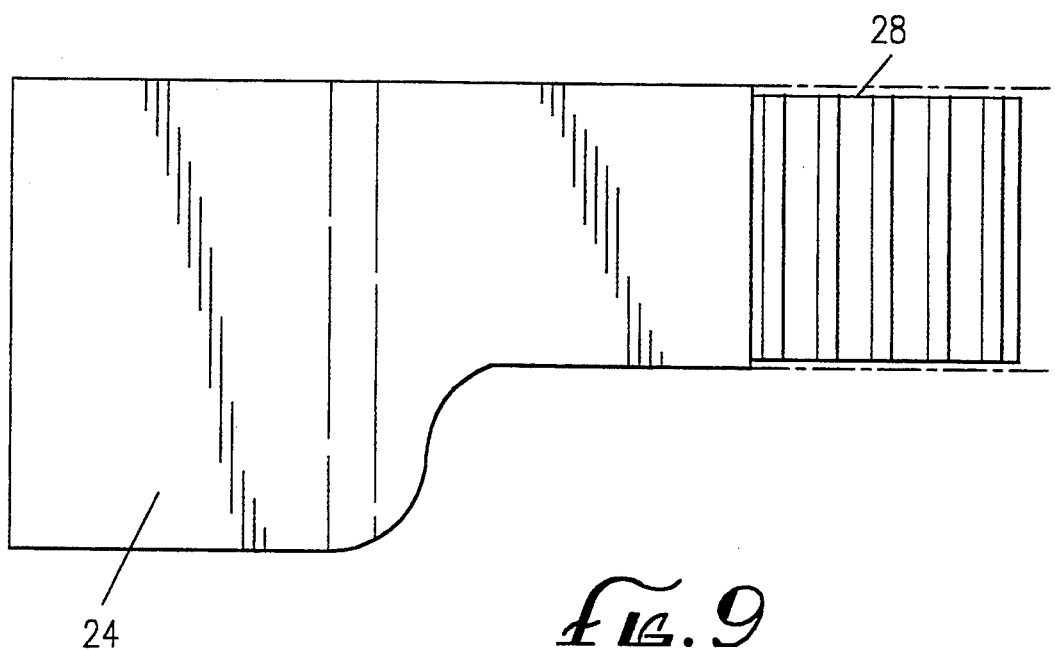
FIG. 9 is a side view taken along line 9—9 of FIG. 5.
Figure 10:
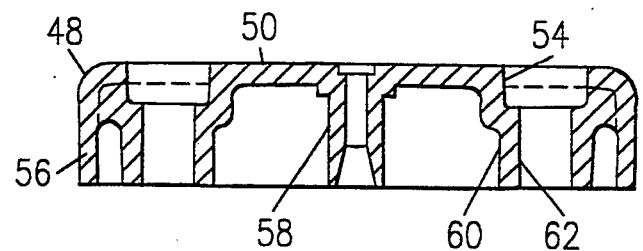
FIG. 10 is a cross-sectional view taken along line 10—10 of FIG. 5.
Figure 11:
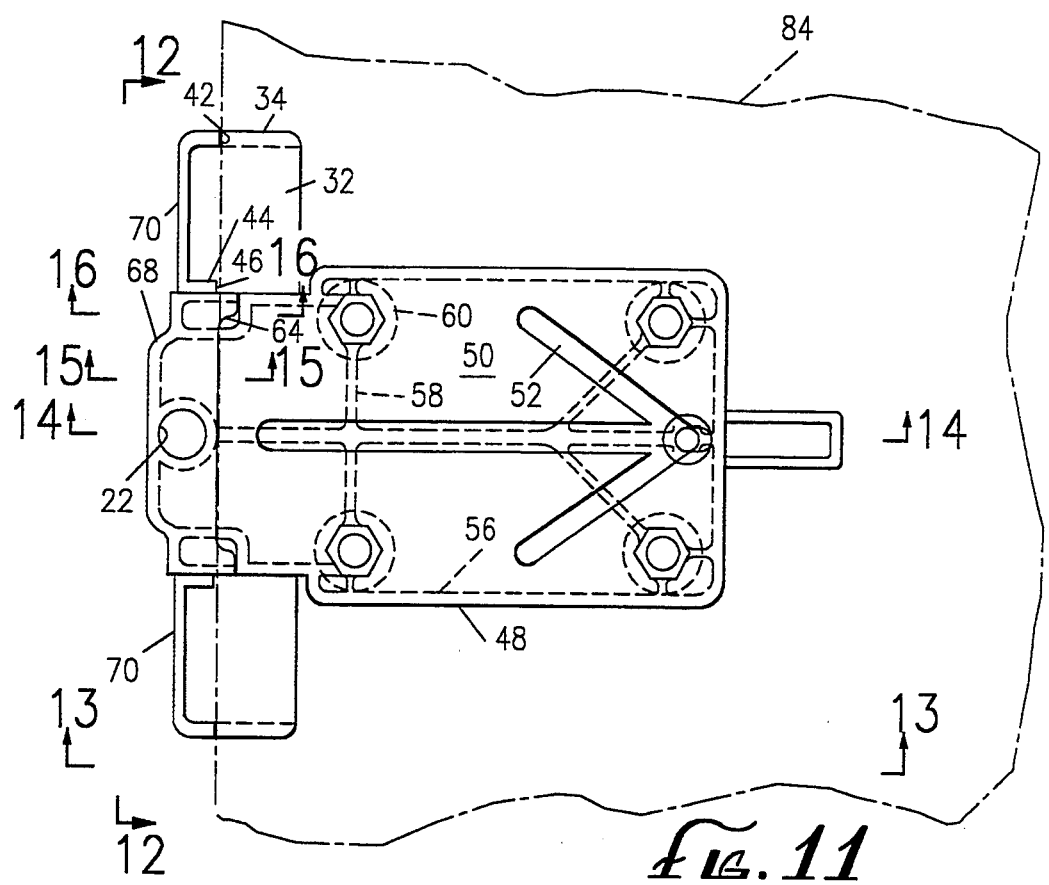
FIG. 11 is plan view of a side support with the portion of a panel shown in phantom.
Figure 12:
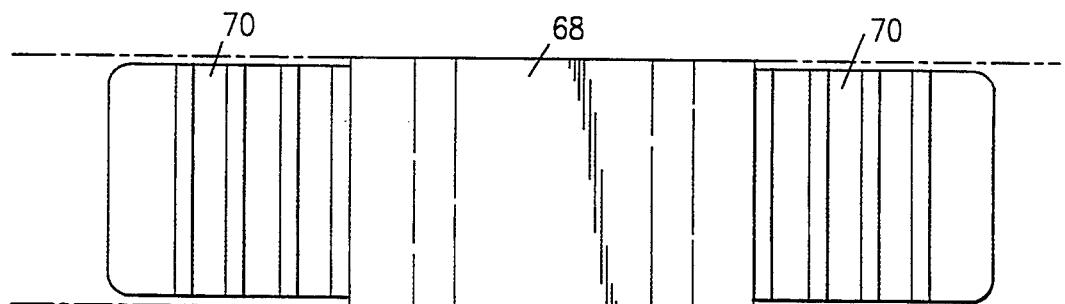
FIG. 12 is a side view taken along line 12—12 of FIG. 11.
Figure 13:
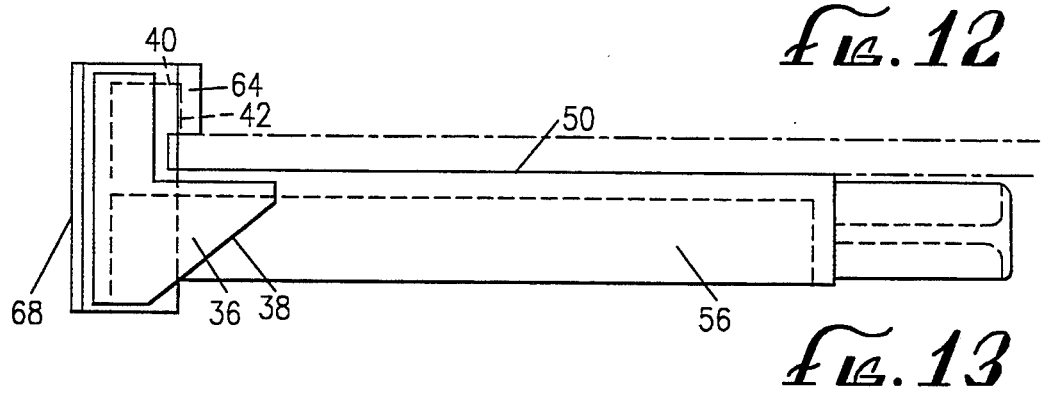
FIG. 13 is an end view taken along line 13—13 of FIG. 11.

At the corners of each deck 12, corner supports 24 are identically arranged. Each corner support, reference being made to FIGS. 5 through 10, includes a body 26 arranged generally in a 90° angle. It is in the body 26 that the vertically oriented sockets 20 are arranged top and bottom. At the end of each leg of the body 26 is a pin 28. Each pin 28 includes a T section formed by an outer wall 30 and a horizontal plate 32. At the outer end of the pin 28 an end wall 34 abuts against the T section. This end wall 34 includes a lower section 36 having an inclined edge 38. An upper section 40 extends to a vertical edge 42 partway along the horizontal plate 32 as can best be seen in FIG. 6. Additional lower sections 36 may be spaced along the pin 28 beneath the horizontal plate 32. At the inner end of each pin 28 an upper section 44 having a vertical edge 46 almost aligned with the vertical edge 42 is provided.

An attachment base 48 extends inwardly from the body 26, bifurcating the angle defined by the pins 28. The attachment base 48 includes a flat upper surface 50 having glue relief grooves 52 in the surface thereof. Recessed cavities 54 are also arranged in the corners of the attachment base 48. A supporting wall 56 and supporting ribs 58 provide strength and rigidity to the attachment base 48. The supporting ribs 58 extend to circular supports 60 aligned with the recessed cavities 54 about holes 62. Extending inwardly from the body 26 are lugs 64.

In addition to the corner supports, side supports 66 are employed. The side supports 66 are designed much like the corner supports 24 except that the pins 28 extend at 180° from a straight body 68. Much of the structure is common between the side supports 66 and the corner supports 24. The same reference numbers denote similar structures in each. Repetition of description here is avoided. Extending from the attachment base 48 is a pin 70. The pin 70 receives a rectangular tube 72 (see FIG. 2).

Connecting the pins 28 and 70 are side rails 74. The side rails 74 are extruded thin wall rigid tubes. The cross section of such a tube is illustrated in FIG. 4. The side rails 74 each have a socket at each end defined by the interior of the cavity. The cross-sectional profile is shown to include a channel 76. This channel 76 is similarly dimensioned to the open area defined by each lug 64 in association with the flat upper surface 50 and the wall of the body 26 or body 68. A shelf 78 extends outwardly from beneath the channel 76 and is supported by an angled portion 80. A rim 82 is defined by the portion of the side rail 74 extending upwardly above the channel 76.

Arranged in the channel 76 of each of the side rails 74 and beneath the lugs 64 is a plate 84. The plate is rigid, made of plywood, medium density fiberboard, hardboard, particleboard, plastic panels, foam composite panels, corrugated plastic or cardboard panels or other composite combination thereof. With each deck 12 fully assembled, the plate 84 is retained by these elements.

In assembling any deck 12 of the rack, glue is used. Glue is employed on the attachment bases 48 and may be used on the pins 28 and 70. The size of the rack may also be selected from a wide variety of sizes because of modular construction. None, one or more side supports 66 may be employed to alter the width of each deck 12. The number of decks 12 also determines size in terms of height. The casters 14 and the elongate columns 18 provide additional support as added sections are included. The size of the deck 12 may also be conveniently determined by selecting the lengths of the extruded side rails 74. Their lengths are easily accomplished by selecting and sawing or cutting the extrusion. The panel 84 must be cut to the appropriate size as well as the rectangular tube 72. The elongate columns 16 and 18 may also be varied at the time of fabrication or later to determine the ultimate height of storage area between decks 12.

The overall strength of the decks is exceptional. Even central bending is accommodated by the rectangular tube 72 or the attachment bases 48. As the bases attempt to rotate downwardly, the bodies 26 and 68 both further engage the plate 84 as well as transmit displacement to the side rails 74. Because of the shapes of the side rails 74 and the associated pins 28 and 70, the side rails also attempt to rotate but are restrained by the plate 84. Thus, increased rigidity is experienced.

Thus, a rolling, in-store merchandise display rack is disclosed which is safe, stable, capable of holding heavy loads and easy to assemble without the use of tools. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A rack comprising
   a plate;
   corner supports each including pins at 90° and an attachment base bifurcating said 90° between said pins and extending beneath and being attached to said plate;
   side supports each including said pins at 180° and a said attachment base extending at 90° to said pins and extending beneath and being attached to said plate;
   side rails between said corner supports and said side supports and including sockets at each end thereof to receive said pins.

2. The rack of claim 1, said pins each having a non-circular cross section.

3. The rack of claim 2, said side rails including a shelf extending beneath said plate.

4. The rack of claim 1, said side rails being thin wall tubes of uniform cross section.

5. The rack of claim 1 further comprising four said corner supports and at least two said side supports.

6. The rack of claim 5 further comprising casters affixed to said attachment bases, respectively.

7. A rack comprising
   a plate;
   corner supports each including pins at 90° and an attachment base bifurcating said 90° between said pins and extending beneath and being attached to said plate;
   side supports each including said pins at 180° and a said attachment base extending at 90° to said pins and extending beneath and being attached to said plate;
   side rails between said corner supports and said side supports and including sockets at each end thereof to receive said pins and a channel receiving the edges of said plate.

8. The rack of claim 7, said channels being affixed to said plate.

9. The rack of claim 7, said rails being thin wall hollow rigid extrusions with said sockets being defined by and within said thin wall, said channel with one side defining a shelf extending beneath said plate and an angled support wall beneath said shelf being defined by said thin wall.

10. The rack of claim 8, said attachment bases and said channels being affixed by glue to said plate.

11. A rack comprising
    multiple decks, each including a plate, corner supports each including pins at 90°, an attachment base bifurcating said 90° between said pins and extending beneath and being attached to said plate and vertically oriented sockets, top and bottom, side supports each including said pins at 180° and a said attachment base extending at 90° to said pins and extending beneath and being attached to said plate, and side rails between said corner supports and said side supports and including sockets at each end thereof to receive said pins;
    elongate columns extending between said vertically oriented sockets to support one said deck on another said deck.

12. The rack of claim 10 further comprising casters affixed to said attachment bases, respectively, on the lower most said deck.

* * * * *